United States Patent [19]
Reichl et al.

[11] Patent Number: 5,462,359
[45] Date of Patent: Oct. 31, 1995

[54] TEMPERATURE PROBE

[75] Inventors: Asta Reichl, Stuttgart; Martin Jenner, Ludwigsburg; Armin Witzig, Renningen; Anita Rose, Hemmingen; Bernd Kuenzl, Schwieberdingen, all of Germany

[73] Assignee: Robert Bosch GmbH, Stuttgart, Germany

[21] Appl. No.: 256,197

[22] PCT Filed: Oct. 21, 1993

[86] PCT No.: PCT/DE93/01002

§ 371 Date: Jun. 30, 1994

§ 102(e) Date: Jun. 30, 1994

[87] PCT Pub. No.: WO94/10547

PCT Pub. Date: May 11, 1994

[30] Foreign Application Priority Data

Nov. 4, 1992 [DE] Germany ............... 42 37 224.0

[51] Int. Cl.$^6$ ............... G01K 1/00; G01K 7/00; H01L 1/02
[52] U.S. Cl. ............... 374/148; 374/183; 374/208; 338/22 R; 338/229
[58] Field of Search ............... 374/138, 144, 374/148, 183, 185, 208; 338/22 R, 25, 28, 27, 226, 229, 231

[56] References Cited

U.S. PATENT DOCUMENTS

| 2,496,806 | 2/1950 | Moffatt | 374/138 |
| 2,799,758 | 7/1957 | Hutchins | 338/229 |
| 2,820,839 | 1/1958 | Schunke | 374/148 |
| 3,005,171 | 10/1961 | Beckman | 338/28 |
| 3,232,794 | 2/1966 | Korton | 374/208 |
| 3,526,134 | 9/1970 | Paine | 374/148 |
| 4,382,246 | 5/1983 | Hansson et al. | 374/185 |
| 4,479,026 | 10/1984 | Brixy et al. | 374/185 |

Primary Examiner—William A. Cuchlinski, Jr.
Assistant Examiner—Andrew Hirshfeld
Attorney, Agent, or Firm—Edwin E. Greigg; Ronald E. Greigg

[57] ABSTRACT

A temperature probe in which mechanical oscillatory excitation that can lead to fracture of the connecting lines is prevented and the response time of the temperature probe to temperature changes is shortened. According to the invention, a resistance element is disposed in a flow window of the temperature probe which is formed by a protective bracket and which projects into a flow line. At least one of the connecting lines that is connected with the resistance element exhibits at least one bent point, which is held in at least one retaining opening formed in the protective bracket, whereby the connecting lines are stabilized. The temperature probe may be used for measuring the temperature of intake air in an intake pipe of a mixture-compressing, external-ignition internal combustion engine.

20 Claims, 1 Drawing Sheet

TEMPERATURE PROBE

PRIOR ART

The invention is directed to a temperature probe for measuring the temperature of a medium flowing in a flow line of an internal combustion engine. A temperature probe is already known (DE 30 44 40 419 C2), in which a temperature-dependent, electrical resistance element with two connecting wires is surrounded, without touching it, by a protective casing exhibiting through-openings. In the case of such a temperature probe, a mechanical oscillatory excitation dependent upon the place of installation may lead to wire fracture in the connecting wires; this leads to a failure of the temperature probe. Over and above this, the protective casing reduces the free access by the flow medium to be measured to the resistance element, which increases the response time to temperature changes.

Since the temperature of the intake air can be for example an input variable for an electronically controlled fuel injection system and input variables which are affected by errors influence the formation of the fuel-air mixture in an undesired manner, for the operation of an internal combustion engine there is a requirement for temperature detection which is as far as possible free from interference and free from delay in temperature changes.

ADVANTAGES OF THE INVENTION

The temperature probe according to the invention, has the advantage that free access in the direction of flow by the flow medium to be measured to the electrical resistance element is guaranteed, whereby temperature detection which is free from interference and free from delay takes place; in this case, at the same time, stabilization of the connecting wires and of the resistance element is assured.

Advantageous developments and improvements to the temperature probe are possible as a result of the measures cited hereinafter.

Particularly advantageous is the arrangement of the connecting lines in the carrier body, whereby extensive protection against instances of damage is achieved.

The formation of a plug element on the carrier body permits simple and disturbance-free connection of connecting lines for signal transmission.

The arrangement of the carrier body in a through-opening in the flow line guarantees advantageous mounting of the temperature probe.

BRIEF DESCRIPTION OF THE DRAWINGS

Illustrative embodiments of the invention are shown in simplified form in the drawings and are explained in greater detail in the description which follows.

DESCRIPTION OF THE ILLUSTRATIVE EMBODIMENT

Figure 1:
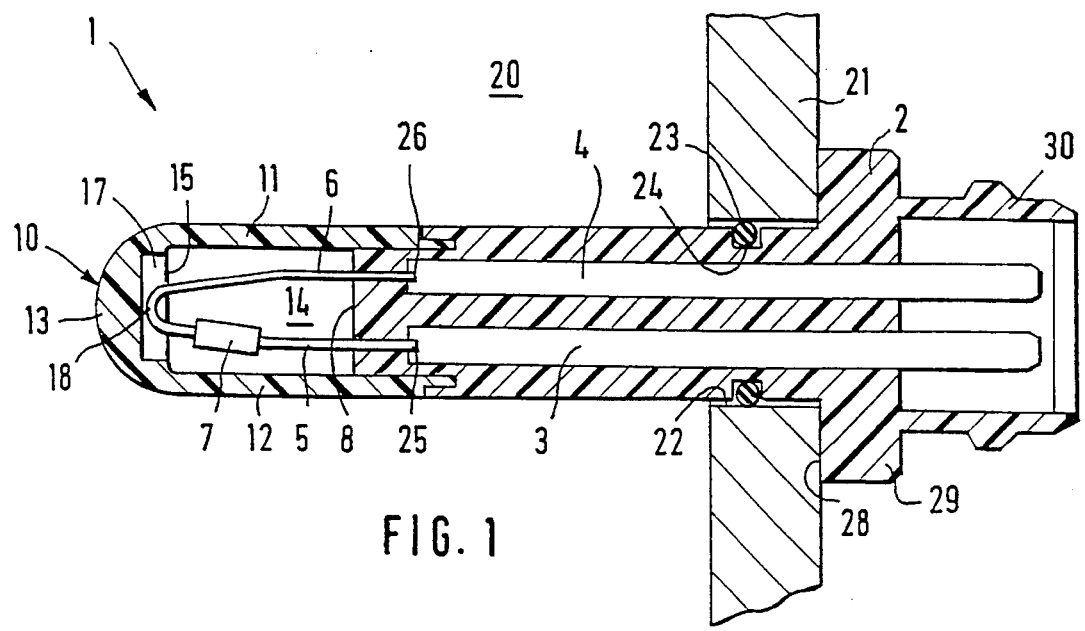
FIG. 1 shows a longitudinal section through a first illustrative embodiment of a temperature probe designed according to the invention.

In FIG. 1, a temperature probe is designated by 1, which temperature probe serves for example for the measurement of the temperature of the intake air in an intake pipe of a mixture-compressing, external-ignition internal combustion engine. The temperature probe 1 has a carrier body 2, which preferably comprises plastic material and in which plug lugs 3, 4 are secured, for example by extension coating. The plug lugs 3, 4 are electrically conductively connected, at connecting points 25, 26, to connecting wires 5, 6 of a temperature-dependent electrical resistance element 7, which advantageously exhibits a negative temperature coefficient (NTC thermistor).

The connecting wire 6 situated on one of the sides of the resistance element 7 is approximately twice the length of the connecting wire 5 engaging on the other side of the resistance element 7 and exhibits a curved, approximately semicircular bend point 18, which is situated close to the resistance element 7, whereby the connecting wires 5, 6 adopt an approximately U-shaped course. At an end face 8, facing the resistance element 7, of the carrier body 2 there is formed a protective bracket 10, which laterally surrounds the resistance element 7 and the connecting wires 5, 6. The protective bracket 10 has two limbs 11, 12 and a base side 13, which together with the end face 8 form an approximately rectangular flow window 14. The connecting wires 5, 6 are in this case situated approximately parallel to the limbs 11, 12.

On an internal surface 15, situated opposite to the end face 8, of the base side 13 there is formed, towards the flow window 14, a retaining opening 17 into which the bend point 18 of the connecting wire 6 projects. In this case, the retaining opening 17 can adopt any desired form, for example it can penetrate the wall of the flow window 14 partially (as shown in FIG. 1) or even completely. The flow window 14 projects into the interior of a flow line 20 and is disposed perpendicular to the direction of flow in such a manner that the base side 13 is situated transversely to the direction of flow, whereby the free access by the flow medium to the resistance element 7 is guaranteed. The connecting points 25, 26 can, as shown in FIG. 1, be enclosed by the carrier body 2, or can also project into the flow window 14.

The flow line 20 has a wall 21 with a throughbore 22 which is penetrated by the carrier body 2 and the plug lugs 3, 4 disposed therein. A sealing ring 23 sits in an annular groove 24, which is disposed on the carrier body 2, and prevents the medium flowing in the flow line 20 from passing through the through-bore 22 to outside the flow line 20. As a result of the formation of a step 28, for example of a securing flange 29, on the carrier body 2, the depth of penetration of the flow window 14 into the flow line 20 can be defined in a simple manner. At that end of the plug lugs 3, 4 which is situated outside the flow line there is situated a plug element 30, which is formed by the carrier body 2 and permits an advantageous connection of the temperature probe to an external, electronic evaluating device.

Figure 2:
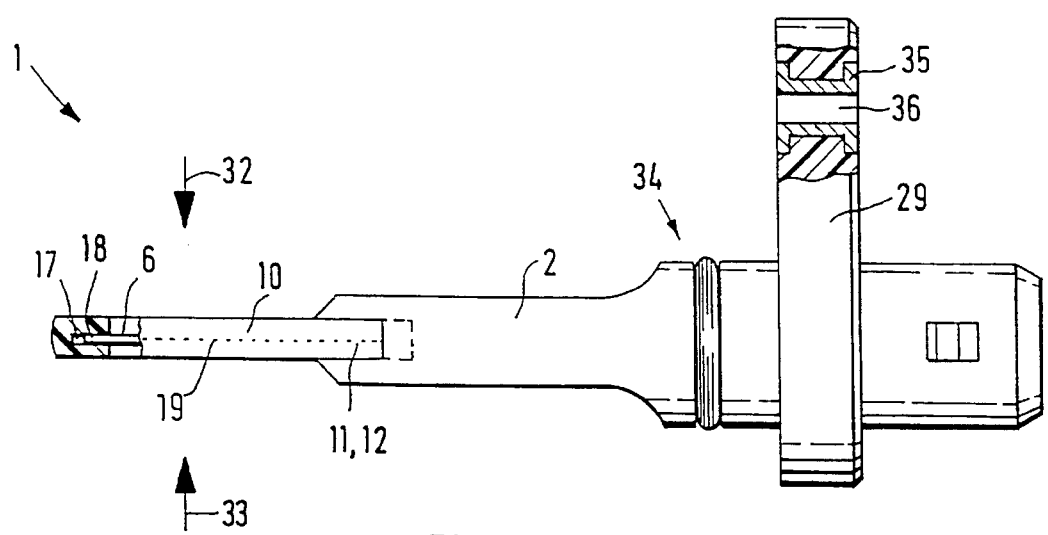
FIG. 2 shows a side elevation of a temperature probe according to the illustrative embodiment according to FIG. 1.

FIG. 2 shows a side elevation of the temperature probe 1, which is designed according to the invention and which receives incident flow of the flow medium to be measured, in the direction of the arrow 32 or 33. The carrier body 2 has, in a region 34 penetrating the wall 21 of the flow line 20 (FIG. 1), a round cross-section, which tapers towards that end of the carrier body 2 which is situated in the flow, and in this case becomes rectangular.

It is indicated in FIG. 2 that the protective bracket 10 can both be formed by the carrier body 2 and can be designed as a separate part, and, for example, can be fastened to the carrier body 2 (broken lines) by extrusion coating of the free ends of the limbs 11, 12.

The partial section at the protective bracket 10 shows the retaining opening 17, in which the bend point 18 of the connecting wire 6 is fastened. This can happen by the bend point 18 being pressed into the retaining opening 17 of an integral protective bracket 10 in the case of a retaining opening 17 which is narrow in the direction of flow 32, 33, or being subsequently bonded in the case of a wide retaining opening 17, for example by a finally applied insulating varnish which is resistant to chemical and abrasive influences. If the protective bracket 10 is designed separately, then it can, over and above this, be divided along its longitudinal axis 19 (dotted line), so that the bend point 18 of the connecting wire 5 is partially enclosed when the two halves are joined together.

The flange 29 is extended in the direction of the arrow 33 and, by extrusion coating, encloses a casing body 35 of metal, which casing body has a through-bore 36, through which for example the carrier body 2 is securable to the wall 21 of the flow line 20 (FIG. 1) by means of a screw connection.

Figure 3:
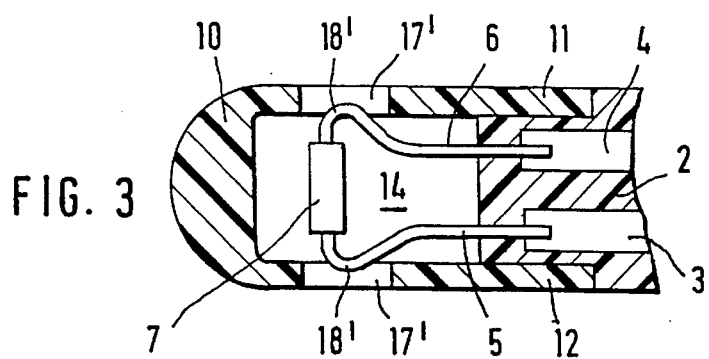
FIG. 3 shows a partial section through a flow window of a second illustrative embodiment of a temperature probe.

FIG. 3 shows a second illustrative embodiment of the temperature probe according to the invention, using the same reference symbols as in FIGS. 1 and 2 for identical and identically acting parts. The flow window 14 formed by the protective bracket 10 is shown, in which window the resistance element 7 is disposed. The connecting lines 5, 6 are in this case designed to be of approximately equal length and in each instance have a bend point 18' close to the resistance element 7. On the limbs 11, 12 of the protective bracket 10 there is formed in each instance one retaining opening 17', in which the bend points 18' are fixed in accordance with one of the previously mentioned possibilities. Contact with the connecting wires 5, 6 is made in accordance with FIG. 1, via the plug lugs 3, 4 disposed in the carrier body 2.

The foregoing relates to a preferred exemplary embodiment of the invention, it being understood that other variants and embodiments thereof are possible within the spirit and scope of the invention, the latter being defined by the appended claims.

We claim:

1. A temperature probe for measuring the temperature of a medium flowing in a flow line of an internal combustion engine, having:
   a temperature-dependent, electrical resistance element (7), connected with two rigid connecting wires (5, 6);
   and a carrier body (2) that holds the connecting wires, in which a protective bracket (10), which encloses a flow window (14), is connected to the carrier body (2);
   and the resistance element (7) is disposed in the flow window (14) that projects into the flow line (20), and at least one of the connecting wires (5, 6) exhibits a curved bend point (18, 18'), which projects into at least one retaining opening (17, 17') formed in at least one wall of the protective bracket (10).

2. A temperature probe according to claim 1, in which the protective bracket (10) has two oppositely disposed limbs (11, 12) and a closed base side (13) remote from the carrier body.

3. A temperature probe according to claim 2, in which the carrier body (2) penetrates a through-bore (22) formed in a wall adjacent the flow line (20) and at least a region (34) of the carrier body (2) which is situated in the through-bore (22) has a cylindrical external surface with an annular groove (24), in which a sealing ring 1(23) seals the flow line (20) with respect to a surrounding area of the flow line (20).

4. A temperature probe according to claim 2, in which the protective bracket (10) is firmly connected to the carrier body (2) by extrusion coating of the limbs (11, 12).

5. A temperature probe according to claim 2, in which the connecting wires (5, 6) are electrically conductively connected to a pair of plug lugs (3, and 4), which are disposed parallel to one another and extend along a longitudinal axis of the carrier body (2) at least partially in an interior of the carrier body (2), and the carrier body (2) encloses the plug lugs (3, 4) in an electrically insulated fashion.

6. A temperature probe according to claim 5, in which an integral electrical plug element (30) is formed at an end of the plug lugs (3, 4) which is remote from the connecting wires (5, 6).

7. A temperature probe according to claim 5, in which the connecting wires (5, 6) of the plug lugs (3, 4) and of the resistance element (7) are at least partially provided with a protective varnish which is resistant to chemical and abrasive influences.

8. A temperature probe according to claim 1, in which the at least one bent point (18) is bonded in the at least one retaining opening (17, 17').

9. A temperature probe according to claim 1, in which the protective bracket (10) is part of the carrier body (2) and the at least one retaining opening (17, 17') for the at least one bent point (18, 18') is formed in the at least one wall of the protective bracket (10).

10. A temperature probe according to claim 9, in which the carrier body (2) penetrates a through-bore (22) formed in a wall adjacent the flow line (20) and at least a region (34) of the carrier body (2) which is situated in the through-bore (22) has a cylindrical external surface with an annular groove (24), in which a sealing ring (23) seals the flow line (20) with respect to a surrounding area of the flow line (20).

11. A temperature probe according to claim 9, in which the connecting wires (5, 6) are electrically conductively connected to a pair of plug lugs (3, and 4), which are disposed parallel to one another and extend along a longitudinal axis of the carrier body (2) at least partially in an interior of the carrier body (2), and the carrier body (2) encloses the plug lugs (3, 4) in an electrically insulated fashion.

12. A temperature probe according to claim 11, in which an integral electrical plug element (30) is formed at an end of the plug lugs (3, 4) which is remote from the connecting wires (5, 6).

13. A temperature probe according to claim 11, in which the connecting wires (5, 6) of the plug lugs (3, 4) and of the resistance element (7) are at least partially provided with a protective varnish which is resistant to chemical and abrasive influences.

14. A temperature probe according to claim 1, in which the connecting wires (5, 6) are electrically conductively connected to a pair of plug lugs (3, and 4), which are disposed parallel to one another and extend along a longitudinal axis of the carrier body (2) at least partially in an interior of the carrier body (2), and the carrier body (2) encloses the plug lugs (3, 4) in an electrically insulated fashion.

15. A temperature probe according to claim 14, in which the carrier body (2) penetrates a through-bore (22) formed in a wall adjacent the flow line (20) and at least a region (34) of the carrier body (2) which is situated in the through-bore (22) has a cylindrical external surface with an annular groove (24), in which a sealing ring (23) seals the flow line (20) with respect to a surrounding area of the flow line (20).

16. A temperature probe according to claim 14, in which the connecting wires (5, 6) of the plug lugs (3, 4) and of the resistance element (7) at least partially provided with a protective varnish which is resistant to chemical and abrasive influences.

17. A temperature probe according to claim 14, in which an integral electrical plug element (30) is formed at an end of the plug lugs (3, 4) which is remote from the connecting wires (5, 6).

18. A temperature probe according to claim 17, in which the carrier body (2) penetrates a through-bore (22) formed in a wall adjacent the flow line (20) and at least a region (34) of the carrier body (2) which is situated in the through-bore (22) has a cylindrical external surface with an annular groove (24), in which a sealing ring (23) seals the flow line (20) with respect to a surrounding area of the flow line (20).

19. A temperature probe according to claim 1, in which the carrier body (2) penetrates a through-bore (22) formed in a wall adjacent the flow line (20) and at least a region (34) of the carrier body (2) which is situated in the through-bore (22) has a cylindrical external surface with an annular groove (24), in which a sealing ring (23) seals the flow line (20) with respect to a surrounding area of the flow line (20).

20. A temperature probe according to claim 19, in which a securing flange is formed on the carrier body (2) between a plug element (30) and the cylindrical external surface by which a depth of penetration of the carrier body (2) into the flow line (20) is determinable, and the carrier body (2) encloses a casing body (35) with a through-opening (36) in the securing flange (29), through which the carrier body (2) can be fixed to the wall adjacent the flow line (20).

* * * * *